United States Patent Office 2,863,873
Patented Dec. 9, 1958

2,863,873

ESTERS OF NICOTINIC ACID

Bo Thuresson af Ekenstam, Bofors, and Nils Evald Natanael Johansson, Karlskoga, Sweden, assignors to Aktiebolaget Bofors, Bofors, Sweden, a Swedish corporation No Drawing. Application August 27, 1957
Serial No. 680,636

Claims priority, application Sweden August 29, 1956

4 Claims. (Cl. 260—295.5)

This invention relates to novel derivatives of nicotinic acid. In particular, it is directed to the novel hexanicotinic acid ester of dipentaerythritol; and method of preparing said ester.

Nicotinic acid and mononicotinic acid esters have been used heretofore as blood vessel dilating agents. Those compounds, when used, have a tendency to cause a too sudden effect, thereby producing erythema on those to whom they have been administered. Those compounds can also produce other secondary effects. It has been proposed to use other compounds having blood vessel dilating properties which do not have the above-mentioned disadvantages. Examples of such proposed compounds are inositol hexanicotinic acid ester and starch esterified with nicotinic acid.

It is among the principal objects of this invention to provide a new compound having improved properties for use of a blood vessel dilating agent; and method of preparing said ester.

The compound of this invention having such improved properties is dipentaerythritol hexanicotinic acid ester having the formula

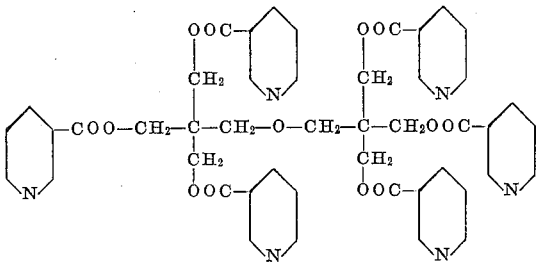

The dipentaerythritol hexanicotinic acid ester is obtained by allowing nicotinic acid chloride to react preferably in some excess with dipentaerythritol having the formula

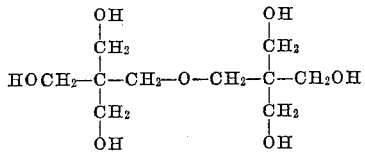

in the presence of a tertiary organic base, as for example, pyridine or its homologs or quinoline. During the course of the reaction the dipentaerythritol hexanicotinic acid ester hydrochloride is formed, which is then reacted in aqueous solution with ammonia whereby the nicotinic acid ester precipitates. The base first above mentioned (the tertiary organic base) acts as a binding agent for the hydrogen chloride.

The instant invention is illustrated by the following example:

Example 1

To 500 gms. of nicotinic acid there was added, during the course of 1 hour, 500 gms. of thionyl chloride. The mixture was then refluxed on a water bath for 4 hours. Then the excess of thionyl chloride was distilled off under vacuum; the remaining cake of nicotinic acid chloride hydrochloride was crushed, and returned to the reaction vessel.

400 ml. of pyridine were added, and 150 gms. of dipentaerythritol were added with stirring. This addition was made during the course of 20 minutes, and the temperature then slowly rised to 165° C. That temperature was maintained for 15 minutes, following which the reaction mass was allowed to run into 20 liters of ice water, while stirring, and when it had completely dissolved, it was decolorized with activated carbon.

The nicotinic acid ester (the dipentaerythritol hexanicotinate) was precipitated by raising the pH to 4.5–5 with ammonia. The obtained nicotinic acid ester weighed approximately 400 gms., corresponding to a yield of approximately 76% based on the dipentaerythritol used. The melting point of the ester was 255°–258° C.

Example 2

To 170 ml. of quinoline there was added alternately in small portions 180 gms. of nicotinic acid chloride hydrochloride (prepared as in Example 1) and 40 gms. of dipentaerythritol. At the end of the addition, the temperature was raised to about 145° C. After further warming at 150° C. for half an hour the charge was poured into 5 l. of water. Some conc. hydrochloric acid was added in order to give a clear solution. After the solution had been treated with activated carbon, the pH was elevated to 4.6. The precipitated product, after being washed and dried, weighed 122 gms. (87.7%) and had a melting point of 249–253° C.

Example 3

To a suspension of 180 gms. of nicotinic acid chloride hydrochloride in 160 ml. methylethylpyridine, which had been warmed to about 50° C. there was added 37 gms. of dipentaerythritol. After being warmed at 150° C. for half an hour the charge was poured into 5 l. of water. The solution was decolorized with activated carbon and the pH was elevated to 4.5. A product weighing 125 g. (97.2%) and melting at 244–250° C. was obtained.

It will be understood that the foregoing description of the invention is merely illustrative of the principles thereof; and accordingly the appended claims are to be construed as defining the invention within the full spirit and scope thereof.

We claim:

1. The dipentaerythritol hexanicotinic acid ester having the formula

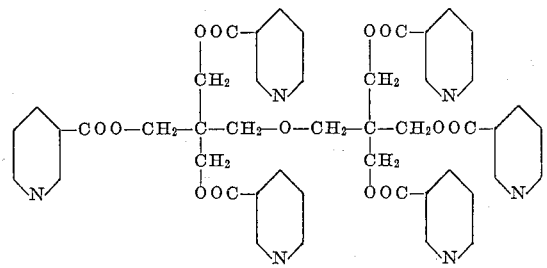

2. Method of preparing dipentaerythritol hexanicotinic acid ester which comprises interacting nicotinic acid chloride with dipentaerythritol having the formula

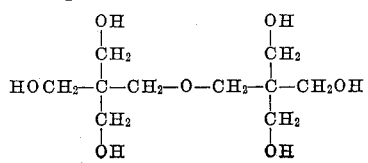

in the presence of a tertiary organic base, thereby forming the hydrochloride of dipentaerythritol hexanicotinic acid ester, dissolving said ester hydrochloride in water, and releasing the said ester by reacting the solution with a strong base.

3. The method in accordance with claim 2 whereby the solution of the dipentaerythritol hexanicotinic acid ester hydrochloride is reacted with ammonia.

4. The method in accordance with claim 2 wherein the tertiary organic base is a member of the group consisting of pyridine, the C-alkyl homologes thereof and quinoline.

No references cited.